United States Patent [19]
Hasegawa et al.

[11] Patent Number: 5,323,318
[45] Date of Patent: Jun. 21, 1994

[54] SYSTEM FOR CONTROLLING VEHICLE AUTOMATIC TRANSMISSION USING FUZZY LOGIC

[75] Inventors: Yusuke Hasegawa; Yoshihisa Iwaki; Ichiro Sakai, all of Saitama, Japan

[73] Assignee: Honda Giken Kogyo Kabushiki Kaisha, Tokyo, Japan

[21] Appl. No.: 941,189

[22] Filed: Sep. 4, 1992

[30] Foreign Application Priority Data

Sep. 4, 1991 [JP] Japan .................. 3-253136
Sep. 4, 1991 [JP] Japan .................. 3-253137

[51] Int. Cl.⁵ .................. B60K 41/26; F16D 41/24; G06F 15/50; G06G 7/70
[52] U.S. Cl. .................. 364/424.1; 74/866; 74/867; 192/4 R; 477/94; 477/97; 477/43
[58] Field of Search ............... 364/424.1, 426; 74/866, 74/859, 867; 60/431; 123/451

[56] References Cited

U.S. PATENT DOCUMENTS

| | | | |
|---|---|---|---|
| 3,890,360 | 6/1975 | Pruvot et al. | 60/431 |
| 4,414,863 | 11/1983 | Heino | 74/866 |
| 4,543,855 | 10/1985 | Oetting et al. | 74/859 |
| 4,551,802 | 11/1985 | Smyth | 364/424.1 |
| 4,740,898 | 4/1988 | McKee et al. | 364/426 |
| 4,964,318 | 10/1990 | Ganoung | 74/859 |
| 5,036,730 | 8/1991 | Sakai et al. | 74/866 |
| 5,048,650 | 9/1991 | Takizawa | 74/866 |
| 5,067,374 | 11/1991 | Sakai et al. | 74/866 |
| 5,079,704 | 1/1992 | Sakai et al. | 364/424 |
| 5,079,705 | 1/1992 | Sakai et al. | 364/424.1 |
| 5,101,350 | 3/1992 | Tokoro | 364/424.1 |
| 5,124,916 | 6/1992 | Tokoru et al. | 364/424.1 |

Primary Examiner—Thomas G. Black
Assistant Examiner—Jacques H. Louis-Jacques
Attorney, Agent, or Firm—Lyon & Lyon

[57] ABSTRACT

A system for controlling multi-step geared continuously variable automatic transmission in which a gear ratio to be shifted to is determined by retrieving a conventional preestablished shift diagram by an engine load and a vehicle speed. A fuzzy reasoning is carried out using parameters such as a driving resistance to correct the gear ratio obtained by retrieved. Alternatively, the fuzzy reasoning is carried out to correct one of the engine load and vehicle speed detected and using the corrected value, the shift diagram is retrieved to determine a gear ratio to be shifted to. Further, another fuzzy reasoning is carried out to ascertain the driver's intention to decelerate and the first fuzzy reasoning is carried out using the inferred value so as to reflect the driver's intention in the shift control.

11 Claims, 16 Drawing Sheets

FIG. 5

| Rule number | Subject | Antecedent | | | Conclusion | Rule meaning |
|---|---|---|---|---|---|---|
| 1 | Hill-climbing | Driving resistance (100, 192 kg) | θ_TH (0, 84 deg) | V (km/h) (20, 40, 250) | Gear (ratio) (-3,-2,-1,0,1,2,3) / Current gear (1,2,3,4) | If throttle opening is small during hill-climbing, then shift down greatly (raise gear ratio greatly). |
| 2 | Hill-climbing | ← | θ_TH (0, 84) | ← | Gear (ratio) -3 / Current gear (1,2,3,4) | If current gear is high (gear ratio is small) and throttle opening is large during hill-climbing, then shift down greatly (raise gear ratio greatly). |
| 3 | Hill-descent | Driving resistance (-128, 0) | θ_TH (0, 10.5, 84) | | Gear (ratio) -3 / Current gear (1,2,3,4) | During hill-descending, shift down greatly (raise gear ratio greatly) to provide engine braking. |
| 4 | Deceleration | DEC (0, 1) | | | Gear (ratio) -3 / Current gear (1,2,3,4) | If driver's intention to decelerate (DEC) exists and current gear is high (gear ratio is small), then shift down greatly (raise gear ratio greatly) to provide engine braking. |
| 5 | Deceleration | DEC (0, 1) | | | Gear (ratio) 0 / Current gear (1,2,3,4) | If driver's intention to decelerate (DEC) exists and current gear is third (gear ratio is somewhat large), then hold current gear (ratio) to maintain engine braking. |

FIG.6

| Rule number | Subject | Antecedent | | | Conclusion | Rule meaning |
|---|---|---|---|---|---|---|
| 6 | DEC | $\theta_{TH}$ (deg) 0–16.5–84, peak 0.7 | $\alpha$ (m/s²) −0.1 to −0.05, peak 1.0 | $V_{BRK}$ (km/h) −40 to −20 to 0 | DEC −0.06 to 0 to 0.06, peak 0.7 | If accelerator is released, braking is being conducted to decelerate and vehicle acceleration is negative, then driver's intention to decelerate (DEC) is increasing. |
| 7 | DEC | $\theta_{TH}$ 0–31.5–84, peak 0.3 | | | DEC −0.06 to 0 to 0.06, peak 0.3 | If accelerator is depressed, then the driver's intention to decelerate (DEC) is decreasing. |

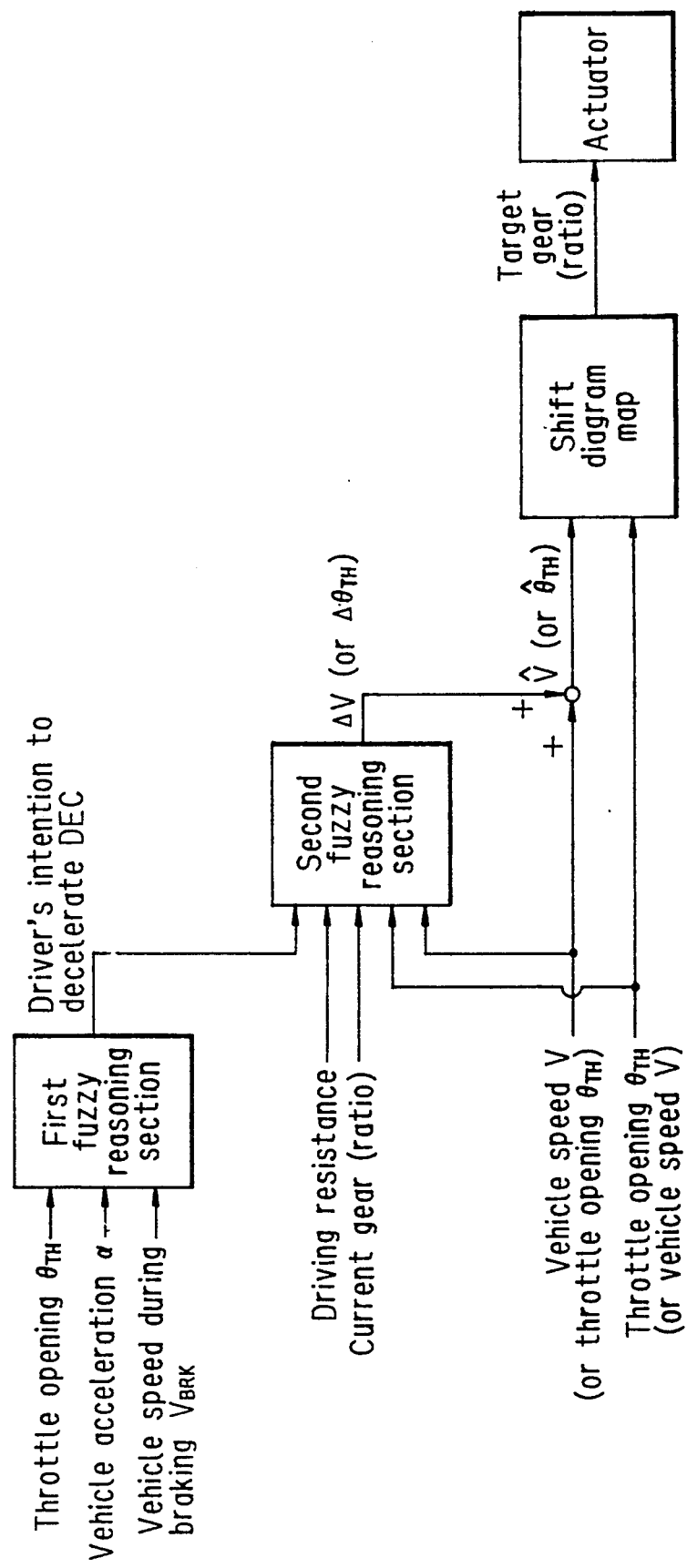

FIG. 18

| Rule number | Subject | Antecedent | | | Conclusion | Rule meaning |
|---|---|---|---|---|---|---|
| 1 | Hill-climbing | Driving resistance 100 192 (kg) | θ_TH 0 84 (deg) | V (km/h) 20 40 250 | V (km/h) -20 0 20 | If throttle opening is small during hill-climbing, then lower vehicle speed greatly. |
| 2 | Hill-climbing | ← | θ_TH 0 84 | ← | Current gear 1 2 3 4 / -20 V | If current gear is high (gear ratio is small) and throttle opening is large during hill-climbing, then lower vehicle speed greatly. |
| 3 | Hill-descent | Driving resistance -128 0 | θ_TH 0 10.5 84 | | Current gear 1 2 3 4 / -20 V | During hill-descending, lower vehicle speed greatly to provide engine braking. |
| 4 | Deceleration | DEC 0 1 | | | Current gear 1 2 3 4 / -20 V | If driver's intention to decelerate (DEC) exists and current gear is high (gear ratio is small), then lower vehicle speed greatly to provide engine braking. |
| 5 | Deceleration | DEC 0 1 | | | Current gear 1 2 3 4 / 0 V | If driver's intention to decelerate (DEC) exists and current gear is third (gear ratio is somewhat large), then keep current vehicle speed to maintain engine braking. |

FIG.19

| Rule number | Subject | Antecedent | Conclusion | Rule meaning |
|---|---|---|---|---|
| 6 | DEC | $\theta_{TH}$ (0, 16.5, 84 deg) at 0.7; $\alpha$ (-0.1, -0.05 m/s²) at 0.7; $V_{BRK}$ (-40, -20, 0 km/h) at 1.0 | DEC (-0.06, 0, 0.06) at 0.7 | If accelerator is released, braking is being conducted to decelerate and vehicle acceleration is negative, then driver's intention to decelerate (DEC) is increasing. |
| 7 | DEC | $\theta_{TH}$ (0, 31.5, 84) at 0.3 | DEC (-0.06, 0, 0.06) at 0.3 | If accelerator is depressed, then the driver's intention to decelerate (DEC) is decreasing. |

SYSTEM FOR CONTROLLING VEHICLE AUTOMATIC TRANSMISSION USING FUZZY LOGIC

BACKGROUND OF THE INVENTION

1. Field of the Invention

This invention relates to an improved vehicle automatic transmission control system.

2. Description of the Prior Art

In both multi-step transmissions which control the gear ratio in a stepwise manner and continuously variable transmissions which control the gear ratio in a stepless manner, the prior art practice has generally been to determine the gear ratio by retrieval from a predetermined shift diagram stored in a microcomputer memory as a map, hereinafter referred to as "shift diagram map", using the vehicle speed and the throttle opening as address data.

Thus conventional automatic transmission control systems determine the gear ratio solely on the basis of vehicle speed and throttle opening and give no consideration to other operating parameters which should duly be taken into account. The result is that, unlike the gear changing operations of an experienced driver operating a vehicle with a manual transmission, the operations conducted by the prior art automatic transmission control systems do not match very well with the shift scheduling desired by the driver.

More specifically, since the prior art systems determine the gear ratio solely on the basis of the vehicle velocity and the throttle opening, they are unable to take into account other important operating parameters in determining the gear ratio, such as whether the vehicle is traveling up or down hill. Because of this, the gear ratio is frequently changed when driving in mountainous areas or the like, which irritates the driver because it differs from the shift scheduling that he or she wants and expects. Simply stated, it is extremely difficult to reflect the intentions of the driver in determining the gear ratio by the conventional control based on the shift diagram map.

Recent years have seen increasing use of fuzzy control in various fields. Since fuzzy control is well suited for use in expert systems designed to achieve control which reflects the operations and experience of an expert in the field concerned, it has also been applied to automatic transmission control systems, a number of which systems have been proposed by the present assignee. (See Japanese Laid-open Patent Publications No. 2(1990)-3739 and No. 2(1990)-85563 (also filed in the United States and matured as U.S. Pat. No. 5,036,730 and filed in EPO under 89306192.9); No. 2(1990)-3738 (also filed in the United States and matured as U.S. Pat. No. 5,079,705 and filed in EPO under 89306167.1); No. 2(1990)-138,558 and No. 2(1990)-138,561 (also filed in the United States and matured as U.S. Pat. No. 5,067,374 and filed in EPO under 89311976.8); No. 2(1990)-138,559, No. 2(1990)-138,560 and No. 2(1990)-150,558 (also filed in the United States and matured as U.S. Pat. No. 5,079,704 and filed in EPO under 89311970.1); and No. 4(1992)-8964 (also filed in the United States under U.S. Pat. No. 691,066 and EPO under 91303878.2).

On the other hand, notwithstanding the drawbacks pointed out above, the more conventional technology for determining the gear ratio from the shift diagram map using the vehicle speed and the throttle opening as address data has the merit of being very well established.

SUMMARY OF THE INVENTION

An object of the invention is, therefore, to provide a vehicle automatic transmission control system which overcomes the aforesaid shortcomings of the prior art by combining conventional gearshift control by retrieval from the shift diagram map and fuzzy logic control so as to make optimum use of the advantages of both types of control and thus enable the control value to be decided not solely on the basis of the vehicle speed and the throttle opening but also taking into account various other operating parameters which should by rights be given consideration in determining the gear ratio.

Another object of the invention is to provide a vehicle automatic transmission control system which determines the gear ratio by retrieval from the conventional shift diagram map and then adjusts the determined gear ratio according to the results of fuzzy reasoning conducted on the basis of operating parameters including at least the driving resistance, thereby preventing frequent changing of the gear ratio even when driving in mountainous areas.

Further object of the invention is to provide a vehicle automatic transmission control system which corrects the detected vehicle speed value and/or throttle opening value according to the results of fuzzy reasoning conducted on the basis of operating parameters including at least the driving resistance and then uses the corrected value(s) for retrieving the gear ratio from the conventional shift diagram map, thereby preventing frequent changing of the gear ratio even when driving in mountainous areas.

Still further object of the invent°ion is to provide a vehicle automatic transmission control system which determines the gear ratio by retrieval from the conventional shift diagram map, infers the intention of the driver and then corrects the determined gear ratio according to the results of fuzzy reasoning conducted on the basis of operating parameters including at least the inferred values, thereby reflecting the intention of the driver in the control to a high degree.

Yet still further object of the invention is to provide a vehicle automatic transmission control system which infers the intention of the driver, corrects the detected vehicle speed value and/or throttle opening value according to the results of fuzzy reasoning conducted on the basis of operating parameters including at least the inferred value(s) and then uses the corrected values for retrieving the gear ratio from the conventional shift diagram map, thereby reflecting the intention of the driver in the control to a high degree.

For realizing these objects, the present invention provides a system for controlling a vehicle multi-step geared or continuously variable automatic transmission, comprising first means for determining parameters indicative of operating conditions of the vehicle, second means for retrieving a preestablished shift diagram by the determined parameters to determine a gear ratio to be shifted to, and actuator means for driving a gear ratio shift mechanism in response to the determined gear ratio. The system further comprises third means for carrying out a fuzzy reasoning to correct at least one of the determined parameters such that said second means retrieves the preestablished shift diagram by the parameters including the corrected one, and/or to correct the determined gear ratio to be shifted to.

BRIEF DESCRIPTION OF THE DRAWINGS

These and other objects and advantages of the invention will be more apparent from the following description and drawings, in which:

FIG. 5 is a chart showing fuzzy production rules used in a second fuzzy reasoning referred to in FIG. 3 flow chart to determine a gear ratio correction amount;

FIG. 6 is a chart showing fuzzy production rules used in a first fuzzy reasoning referred to in FIG. 3 flow chart to determine driver's intention to decelerate;

FIG. 17 is a block diagram, similar to FIG. 4, but showing the characteristic feature of the second embodiment;

FIG. 18 is a chart, similar to FIG. 5, but showing fuzzy production rules used in a second fuzzy reasoning of the second embodiment to determine a vehicle speed correction amount; and FIG. 19 is a chart showing similar rules used in a first fuzzy reasoning of the second embodiment.

DETAILED DESCRIPTION OF THE PREFERRED EMBODIMENTS

Figure 1:
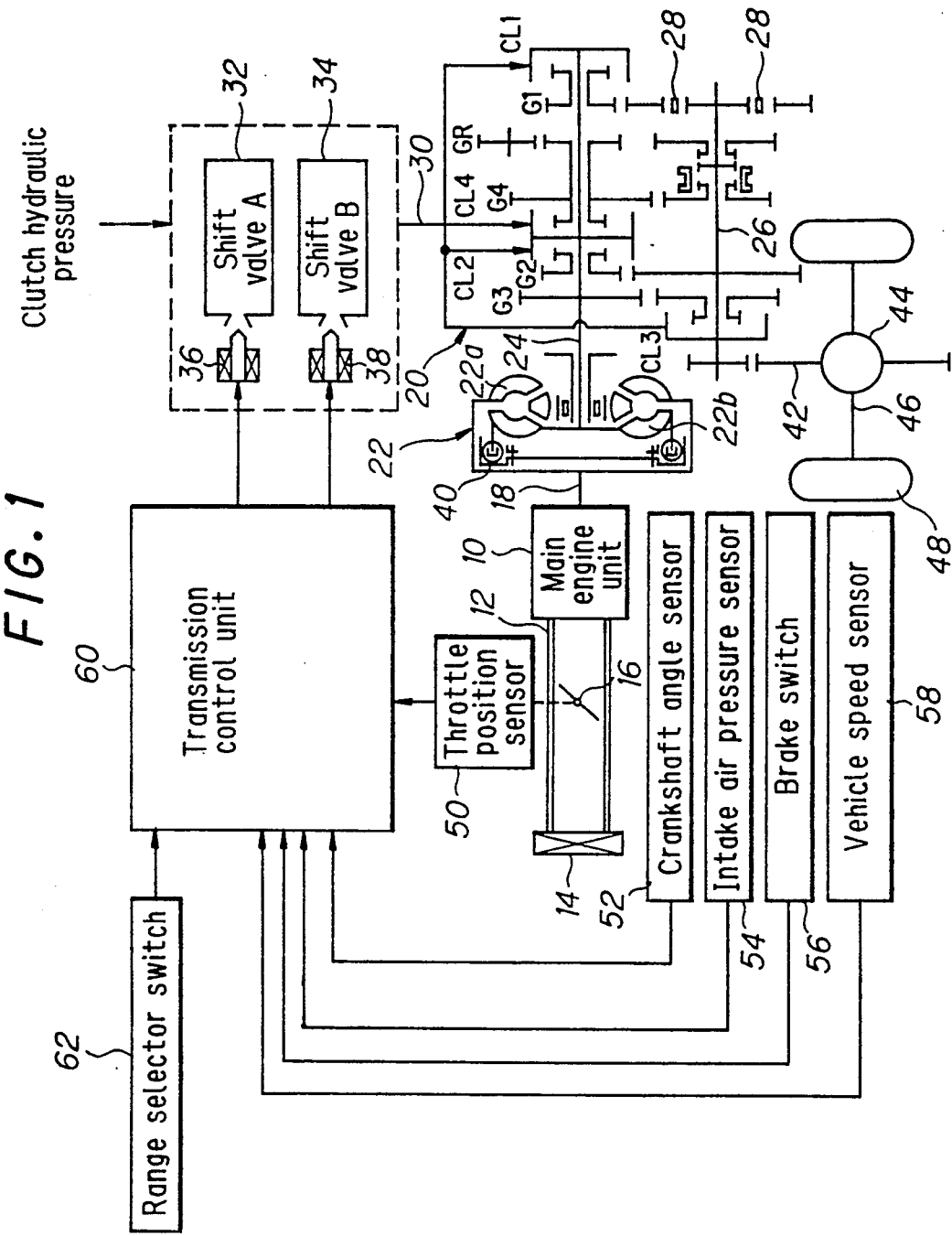
FIG. 1 is a schematic diagram showing the overall arrangement of a vehicle automatic transmission control system according to the present invention.

FIG. 1 is a schematic diagram showing the overall arrangement of the automatic transmission control system according to the present invention, in which the reference numeral 10 denotes the main unit of an internal combustion engine. The main engine unit 10 is connected with an air intake passage 12 having an air cleaner 14 attached to its far end. The flow rate of intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The motive force of the piston is converted into rotating motion which is made available at an output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL1, CL2, CL3 and CL4 (the clutch for the reverse gear is omitted from the drawing in the interest of simplicity). The first speed gear G1 is further provided with hydraulic one-way clutches 28. These hydraulic clutches are connected with a source of hydraulic pressure (not shown) by a hydraulic line 30, and a shift valve A 32 and a shift valve B 34 are provided in the hydraulic line 30. The positions of the two shift valves are changed by the energization/deenergization of respective solenoids 36 and 38, whereby the supply/removal of hydraulic pressure to/from the aforesaid clutches is controlled. Reference numeral 40 designates a lock-up mechanism of the torque converter 22. The countershaft 26 is connected with a differential 44 through a propeller shaft 42, and the differential 44 is connected with wheels 48 through a drive shafts 46. The speed-adjusted engine output is transmitted to the wheels through this power train.

In the vicinity of the throttle valve 16 of the air intake passage 12 there is provided a throttle position sensor 50 such as a potentiometer or the like for detecting the degree of opening of the throttle valve 16. In the vicinity of a rotating member (e.g. a distributor; not shown) of the main engine unit 10 there is provided a crankshaft angle sensor 52 such as an electromagnetic pickup or the like. The crankshaft angle sensor 52 detects the position of the piston in terms of the crankshaft angle and produces a signal once every prescribed number of degrees of crankshaft rotation. At an appropriate location downstream of the throttle valve 16 of the air intake passage 12 there is provided an intake air pressure sensor 54 for detecting the absolute pressure of the intake air. In the vicinity of the brake pedal (not shown) provided on the vehicle floor in the vicinity of the driver's seat there is provided a brake switch 56 for detecting depression of the brake pedal. At an appropriate location near one of the drive shafts 46 there is further provided a vehicle speed sensor 58 such as a reed switch or the like, which produces a signal once every prescribed number of degrees of drive shaft rotation. The outputs of the sensors are sent to a transmission control unit 60. The transmission control unit 60 also receives the output from a range selector switch 62 for detecting the selected position of a range selector.

Figure 2:
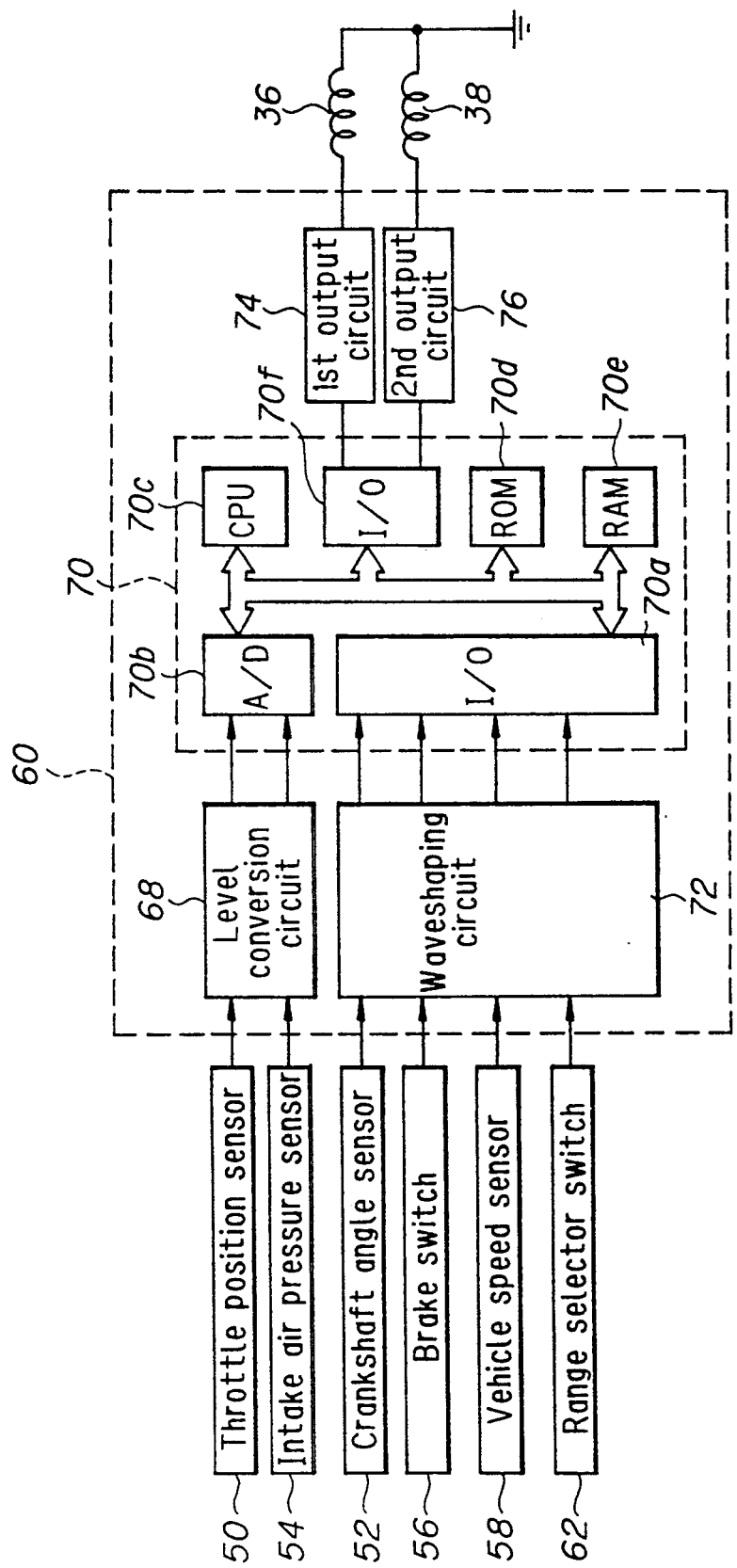
FIG. 2 is a block diagram showing the details of the control unit shown in FIG. 1.

FIG. 2 is a block diagram showing the transmission control unit 60 in detail. As shown in this figure, the analog outputs from the throttle position sensor 50 and the like are input to a level conversion circuit 68 in the transmission control unit 60 for amplification and the amplified signals are forwarded to a microcomputer 70. The microcomputer 70 has an input port 70a, an A/D (analog/digital) converter 70b, a CPU (central processing unit) 70c, a ROM (read-only memory) 70d, a RAM (random access memory) 70e, an output port 70f and groups of registers (not shown) and counters (not shown). The output from the level conversion circuit 68 is input to the A/D converter 70b whereby it is converted into digital values, and the digital values are stored in the RAM 70e. The outputs from the crankshaft angle sensor 52 and the like are first waveshaped in a waveshaping circuit 72 and then input to the microcomputer through the input port 70a to be stored in the RAM 70e. On the basis of he input values and calculated values derived therefrom, the CPU 70c determines a gear position (gear ratio) in a manner to be explained later. In response to the result of the determination, a control value is sent through the output port 70f to a first output circuit 74 and a second output circuit 76 which energize/deenergize the solenoids 36 and 38 so as to shift gears or hold the current gear position as determined.

The operation of the control system will now be explained with respect to the flow charts of FIG. 3 and later figures.

Figure 4:
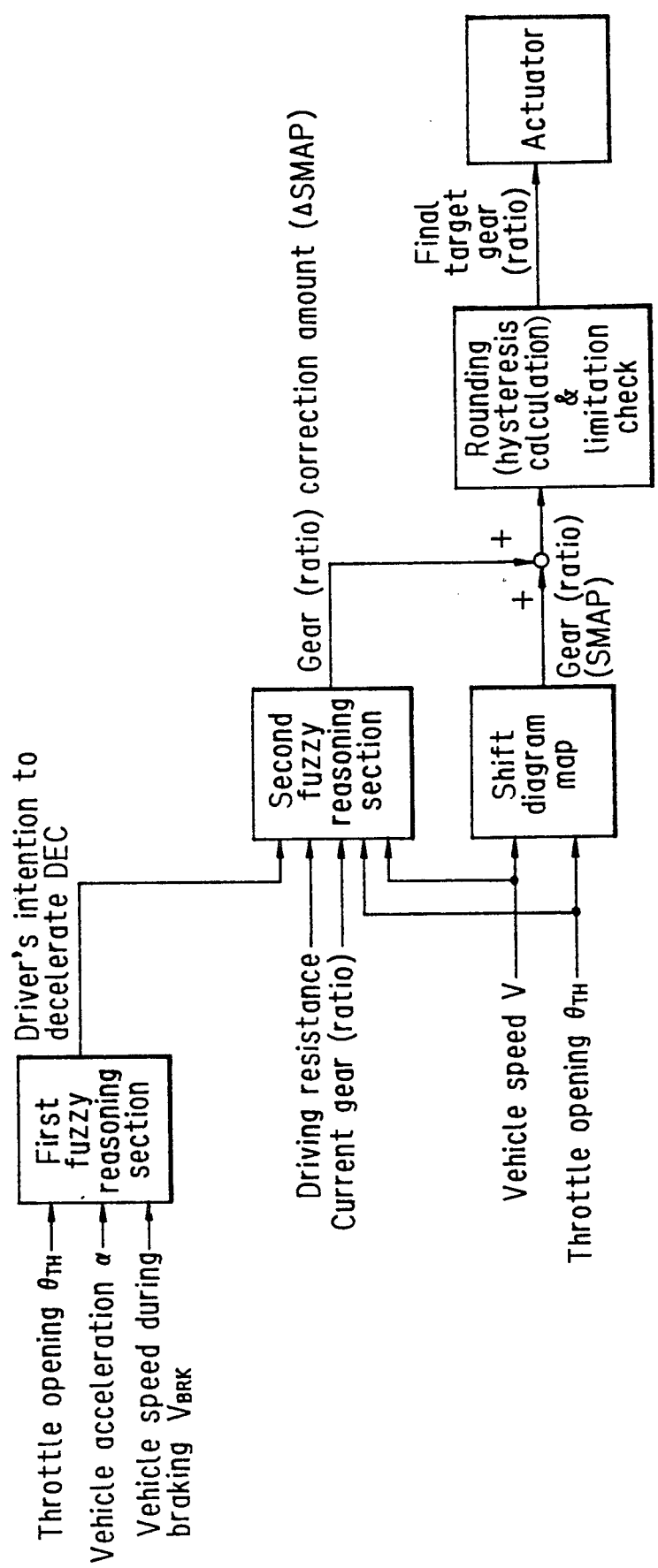
FIG. 4 is an explanatory block diagram showing the characteristic feature of the control system of the present invention.

Before going into a detailed description, however, the general features of the control system will first be explained with reference to FIG. 4. The system according to the invention determines the gear position (gear ratio) in the conventional manner by retrieval from the aforesaid shift diagram map using the vehicle speed V and the throttle opening $\theta$TH as address data and further corrects the retrieved gear position according to the results of fuzzy reasoning conducted by a fuzzy reasoning unit. The fuzzy reasoning unit is constituted of a first and a second stage fuzzy reasoning sections. In the first stage section, the intention (intention to decelerate) of the driver is inferred and, in the second stage section, fuzzy reasoning is conducted on the basis of the value inferred in the first stage section and other operating parameters for determining a gear position (ratio) correction amount (delta SMAP) which is used for correcting (added to) the map-retrieved gear position (ratio)(SMAP). As the reasoned value may include a fractional portion, the value to be added for obtaining the final control value in the second stage section is rounded to a whole number (hysteresis calculation) and subjected to a limitation check. FIG. 5 shows the set of fuzzy production rules used in the second stage fuzzy reasoning section. Since the basic control characteristics are map-defined, the rules shown in FIG. 5 relate only to a limited range of driving conditions such as hill climbing. FIG. 6 shows the set of fuzzy production rules for inferring the driver's intention to decelerate in the first stage fuzzy reasoning section. In the fuzzy reasoning (inference), various operating parameters used in the rule groups are obtained and the value to be output is determined by reasoning using membership functions corresponding to the operating parameters defined by the rules.

Figure 3:
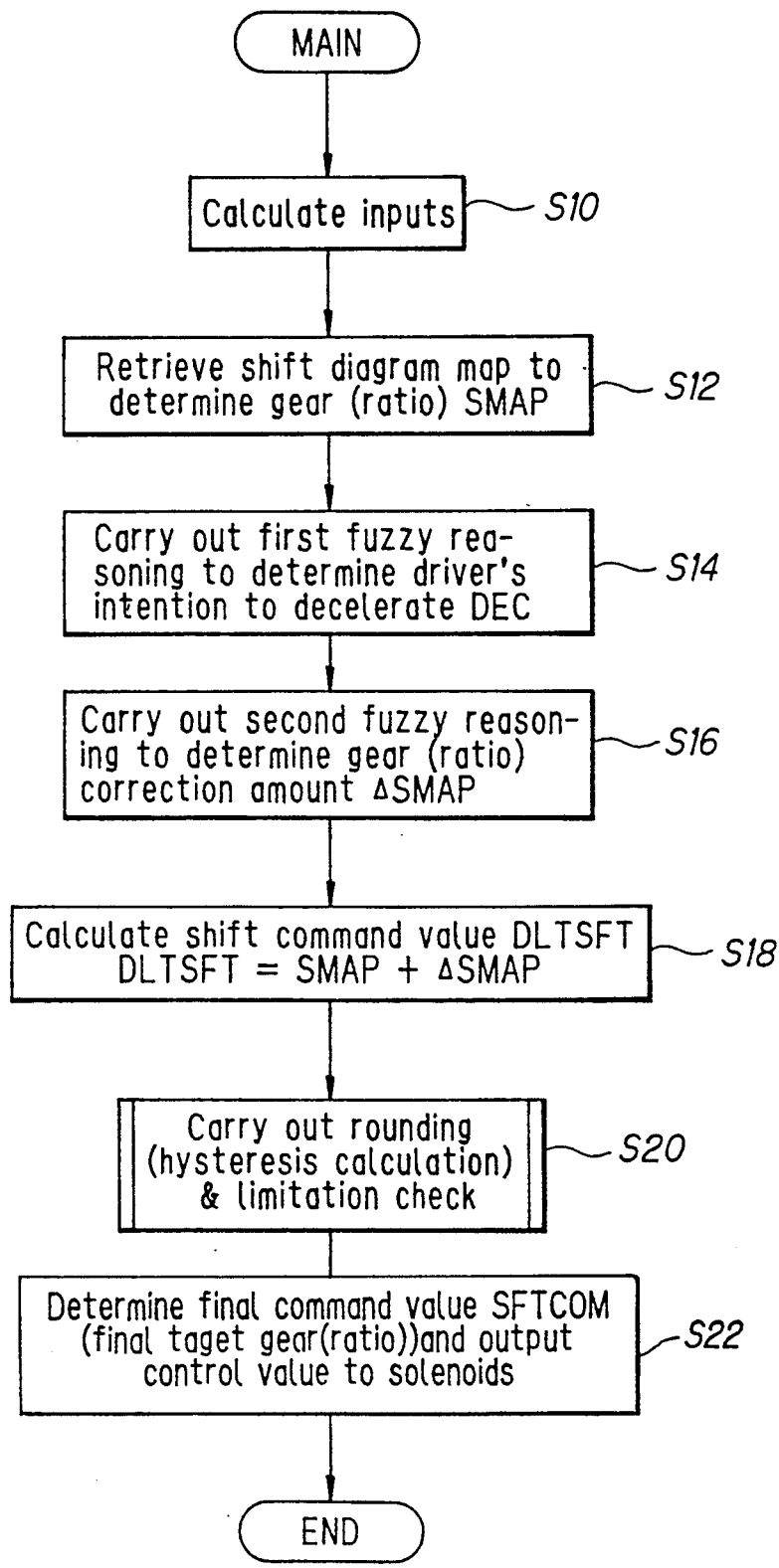
FIG. 3 is a main routine flow chart showing the operation of the control unit shown in FIG. 2.

As shown in FIG. 3, therefore, the procedure begins with the calculation of inputs in step S10. More specifically, the parameters to be used in map retrieval and fuzzy reasoning are calculated in this step. As is clear from the foregoing, the map retrieval parameters are the vehicle speed V and the throttle opening $\theta$TH. The fuzzy reasoning parameters, indicated in FIG. 5, are the driving resistance (kg), the throttle opening $\theta$TH [0°-84° (WOT)], the vehicle speed V (km/h), the current gear position (gear ratio) and, as an example of the driver's intention, the "driver's intention to decelerate" (explained later. This is expressed as "DEC" in the figures). The parameters for inferring the driver's intention to decelerate, indicated in FIG. 6, are the throttle opening $\theta$TH, the vehicle acceleration $\alpha$ (m/s$^2$) and the vehicle speed at braking VBRK (km/h). The throttle opening $\theta$TH is obtained from the value output by the throttle position sensor and the vehicle speed V is calculated from the value output by the vehicle speed sensor. The actual gear position is determined by a calculation that will be explained later. The first difference of the vehicle speed value is used as the acceleration $\alpha$.

The special method used for obtaining the driving resistance will now be explained.

Figure 7:
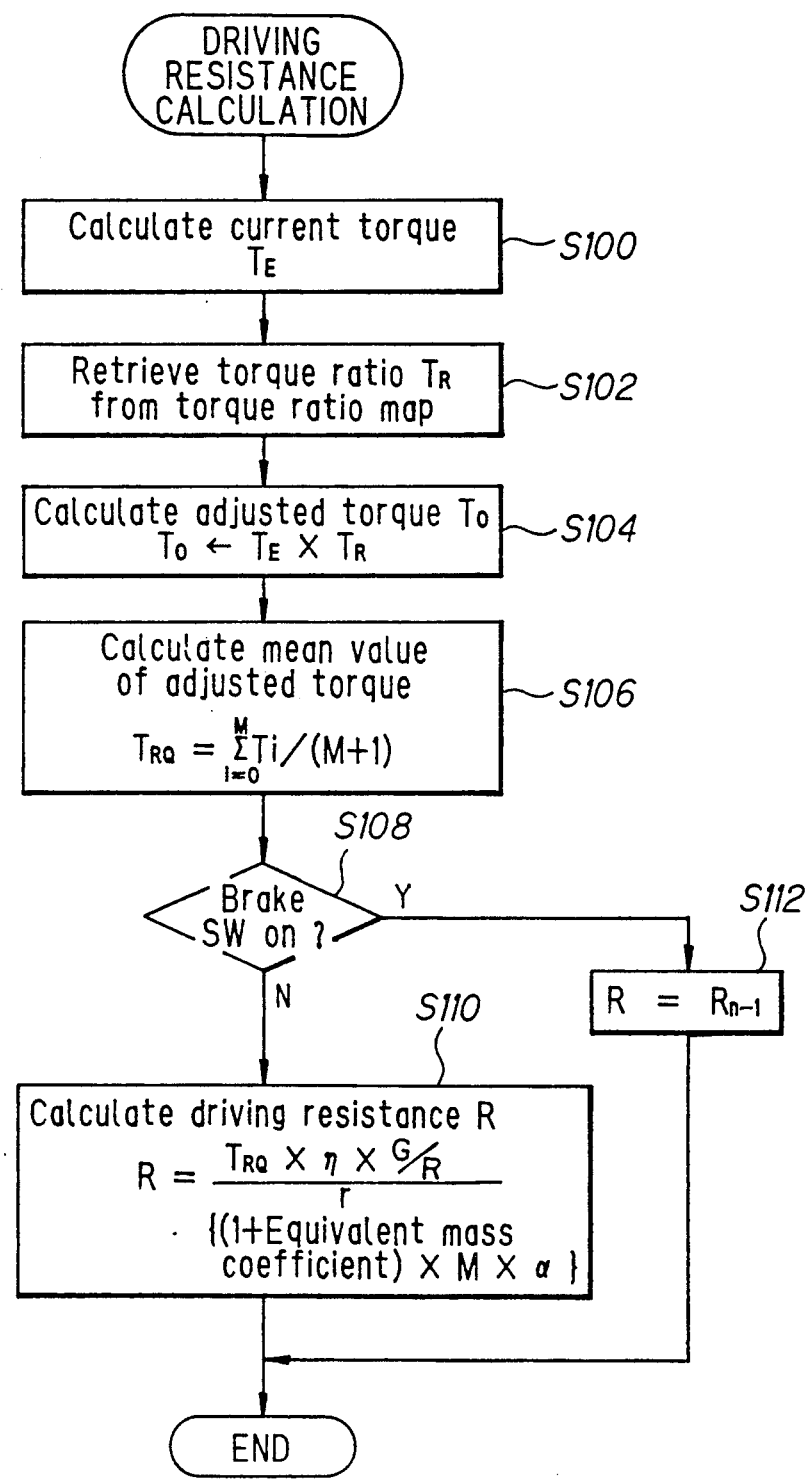
FIG. 7 is a subroutine flow chart showing driving resistance calculation referred to in FIG. 3 flow chart.

The flow chart of a subroutine for calculating the driving resistance is shown in FIG. 7. The embodiment under discussion does not use a torque sensor or the like for ascertaining the driving resistance but determines it by calculation. The procedure for this starts with step S100 in which the current torque TE is calculated as Current torque = (716.2 × Actual horsepower)/Engine speed [kg.m]

Figure 8:
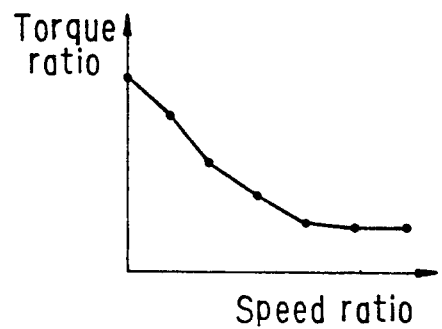
FIG. 8 is a graph explaining the characteristics of a torque ratio defined with respect to a speed ratio referred to in FIG. 7 flow chart.
Figure 9:
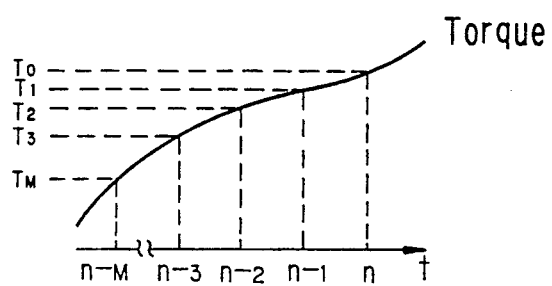
FIG. 9 is a graph explaining mean torque calculation referred to in FIG. 7 flow chart.

The actual horsepower is obtained, for example, by retrieval from a map stored in ROM beforehand, using the engine speed and the intake air pressure as address data. In the equation, 716.2 is the constant conventionally used for converting horsepower to torque. Following the calculation of the current torque TE in step S100, control passes to step S102 in which a torque ratio indicative of the torque increase by the torque converter 22 is retrieved from a map, the characteristic of which is shown in FIG. 8, to step S104 in which the torque calculated in step S100 is multiplied by the value retrieved in step S102, and to step S106 in which the mean value of the adjusted torque is calculated. This adjustment here is made to compensate for the fact there is some time delay between a change in the throttle opening and the time that the change is reflected in the engine output. FIG. 9 shows how the mean value is calculated. After confirming that braking is not being conducted in step S108, control passes to step S110 in which the driving resistance R/L is calculated as follows:

Driving resistance R/L = [(Mean torque TRQ × Transmission efficiency eta × Overall gear ratio G/R)/Effective tire radius r)] − [(1 + Equivalent mass)×Vehicle mass M × Acceleration $\alpha$] [kg]

The transmission efficiency eta, overall gear ratio G/R, effective tire radius r, equivalent mass (equivalent mass coefficient) and vehicle mass M (ideal value) are obtained and stored in ROM in advance.

This reason for calculating the driving resistance in the foregoing manner will now be explained.

The vehicle dynamics can be obtained from the law of motion as

Motive force F − Driving resistance
R = (1 + Equivalent mass) × (Vehicle weight
W/Gravitational acceleration G) × Acceleration
$\alpha$ [kg]     (1)

where

F = (Torque (mean) TRQ × Overall gear ratio G/R × Transmission efficiency eta)/Effective tire radius r [kg]

R = (Rolling resistance $\mu O$ + Grade sin $\theta$) × Vehicle gross weight Wr + Aerodynamic drag ($\mu A \times V^2$) [kg]

The variables in the foregoing equations are the vehicle gross weight Wr, which varies with the number of passengers and the amount of cargo, and the grade sin $\theta$, which differs depending on the inclination of the road surface, and all of these factors are included in the driving resistance. (V represents the vehicle speed.) Therefore, by rewriting the aforesaid equation (1) there is obtained Driving resistance R = (Motive force F) − {(1 + equivalent mass) × Vehicle mass M × Acceleration $\alpha$} [kg] (where vehicle mass M = vehicle weight W/gravitational acceleration G).

If it is found in step S108 that braking is being conducted, since the braking force makes it difficult to calculate the driving resistance with accuracy, control is passed to step S112 in which the value calculated in the preceding cycle is used.

Figure 10:
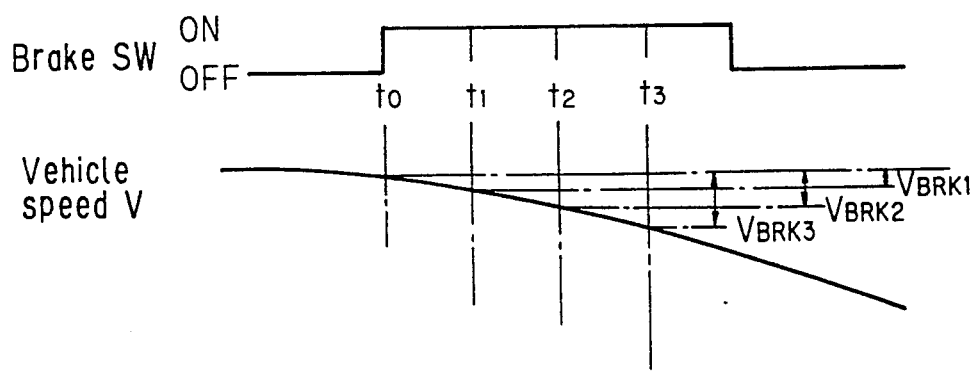
FIG. 10 is a graph explaining a vehicle speed during braking referred to in FIG. 3 flow chart.

The aforesaid parameters are calculated and detected in step S10 of FIG. 3. As shown in FIG. 10, the vehicle speed during braking VBRK is the amount of reduction in vehicle speed following the depression of the brake pedal at time t0 and is obtained from the vehicle speed as a function of measured time lapse following the detection of brake operation.

Figure 11:
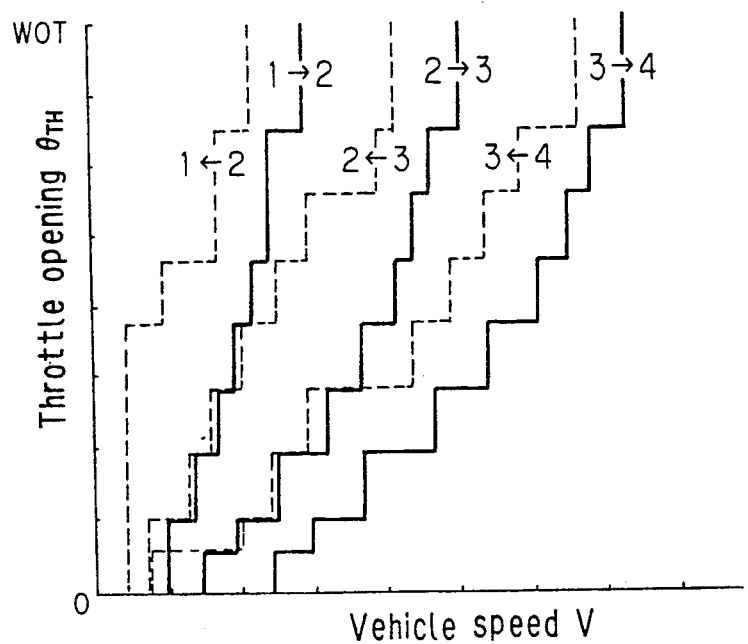
FIG. 11 is a chart showing the characteristics of the conventional shift diagram map referred to in FIG. 3 flow chart.

Control next passes to step S12 in the flow chart of FIG. 3, in which the gear position (ratio) SMAP (basic control value) is retrieved from the shift diagram map. The characteristics of the shift diagram map is shown in FIG. 11. The shift diagram map itself is well known, as is the method of retrieving gear positions therefrom using the vehicle speed V and the throttle opening $\theta$TH as address data.

Control next passes to step S14 in which a first fuzzy reasoning is conducted for inferring the driver's intention to decelerate DEC and then to step S16 in which a second fuzzy reasoning is conducted on the basis of the aforesaid operating parameters, including the driver's intention to decelerate, for deciding the gear position correction amount delta SMAP. This fuzzy reasoning is described in detail the assignee's Japanese Laid-open Patent Publication No. 4(1992)-8964 (U.S. Ser. No. 691,066). Since the reasoning method itself is not a feature of the present invention, it will only be explained briefly with reference to FIG. 6.

First, the detected (calculated) parameters relating to the antecedent (IF part) of each rule are applied to the corresponding membership functions, the values on the vertical axes (membership function values) are read, and the smallest of the values is taken as the degree of satisfaction of the rule. Next, the output value (position of the center of gravity and the weight) of the consequent (THEN part) of each rule is weighted by the degree of satisfaction of the antecedent and the average is calculated:

Fuzzy calculation output = Σ{(Degree of satisfaction of individual rules) × (Position of center of gravity of output) × (Weight)}/Σ{(Degree of satisfaction of individual rules) × (Weight)}

In FIG. 6, for example, if all of the weights are 1.0, we get

Fuzzy calculation output = {(0.7 × 0.03 × 1.0) + (0.3 × −0.03 × 1.0)}/{(0.7 × 1.0) + (0.3 × 1.0)} = 0.012 It is also possible to use the conventional method in which the degree of satisfaction of the antecedent of each rule is used to truncate the output value, the truncated waveforms are then synthesized, and the center of gravity of the resulting synthesized waveform is obtained and used as the fuzzy calculation output.

Some additional explanation regarding the inference of the driver's intention to decelerate DEC according to FIG. 6 may be helpful, particularly as to why reasoning for ascertaining the intention of the driver is conducted in this way. The rules in the preceding figure (FIG. 5) relate to special, limited driving circumstances (hill-climbing, hill-descent and deceleration). Differently from hill-climbing and the like, which relate to the driving environment where the vehicle is located, deceleration is often an intended driving condition that arises from the driver's own desire. Rather than ascertaining it solely from physical quantities, therefore, from the point of realizing control matched to human feelings it is better to infer what the driver's intention is and to use the result together with the other parameters to conduct comprehensive reasoning. Although this approach is used only with respect to the intention to decelerate in this embodiment, it is also possible to ascertain the driver's intention to accelerate or to save fuel through similar reasoning. As mentioned earlier, the parameters used for inferring the intention to decelerate are the throttle opening $\theta$TH, the acceleration $\alpha$ and the vehicle speed during braking VBRK. However, the driver's "intention" is known only to the driver and can only be inferred from operating parameters which change as a result of the driver's operation of the accelerator pedal and other operating members of the vehicle. On the basis of various considerations, it was concluded that the driver has an intention to decelerate in the case where the accelerator pedal is not depressed, the brake pedal is depressed and the acceleration is negative, and that the driver's intention to decelerate is less when he or she depresses the accelerator pedal. The rules set out in the figure were drafted on these assumptions.

In the flow chart of FIG. 3, control passes to step S18 in which the map-retrieved value and the value obtained by fuzzy reasoning are added together to obtain a shift command value DLTSFT indicating a target gear (ratio).

Following this, control passes to step S20 in which the shift command value DLTSFT is rounded to a whole number (hysteresis calculation) and subjected to a limitation check for preventing overrevving. The hysteresis calculation is conducted because the value obtained by the fuzzy reasoning is a weighted mean value and, as such, frequently includes a fractional part, so that the shift command value DLTSFT is also often a value such as 0.8 containing a fractional part. Rounding is therefore conducted for specifying the gear position that is to be shifted to.

Figure 12:
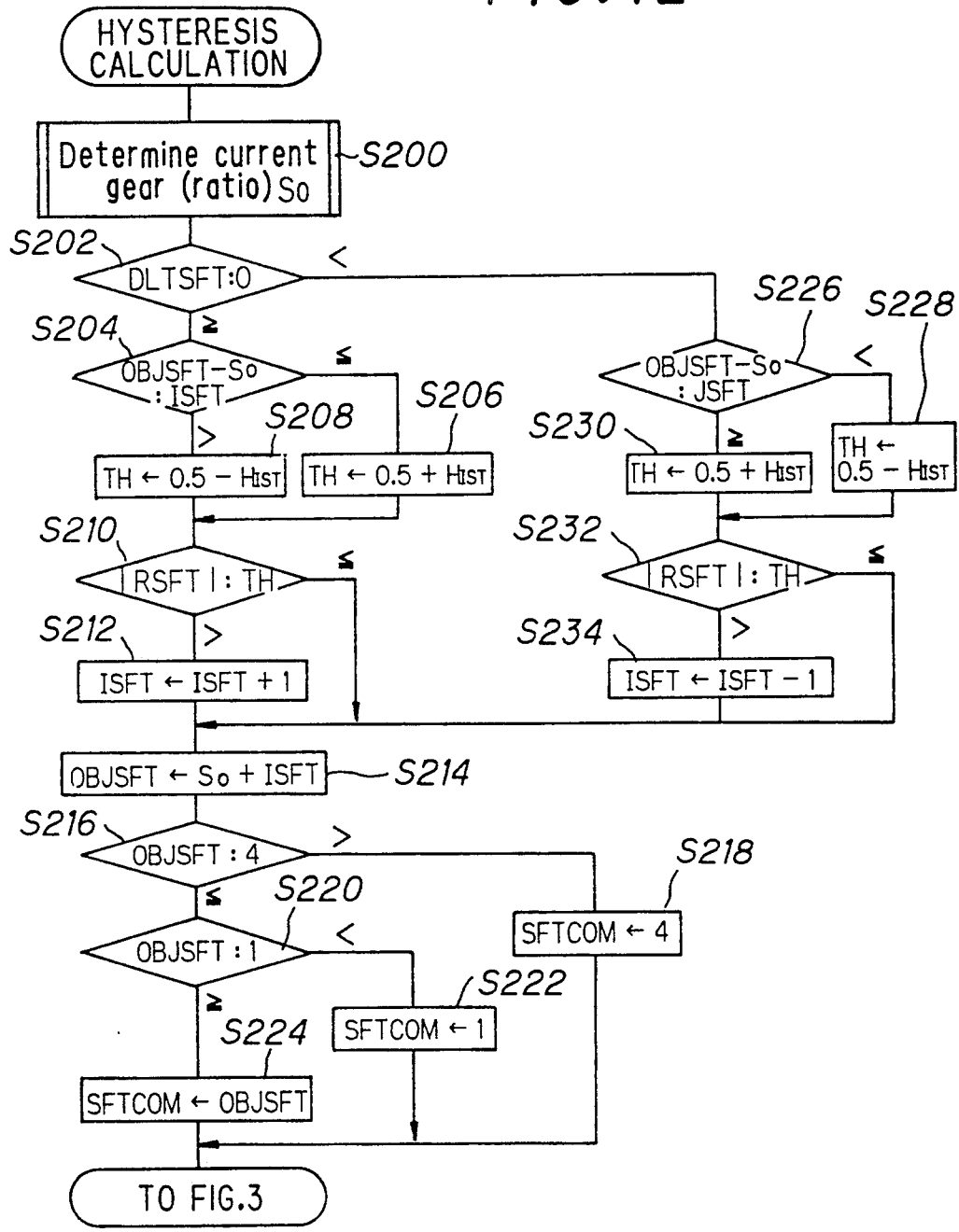
FIG. 12 is a subroutine flow chart showing rounding (hysteresis calculation) and limitation check referred to in FIG. 3 flow chart.

The flow chart of a subroutine for this purpose is shown in FIG. 12. In the first step of the subroutine, step S200, the current gear position $S_O$ is determined. The present embodiment is not provided with a gear position switch and the gear position is determined through a logical process, as explained earlier.

Figure 13:
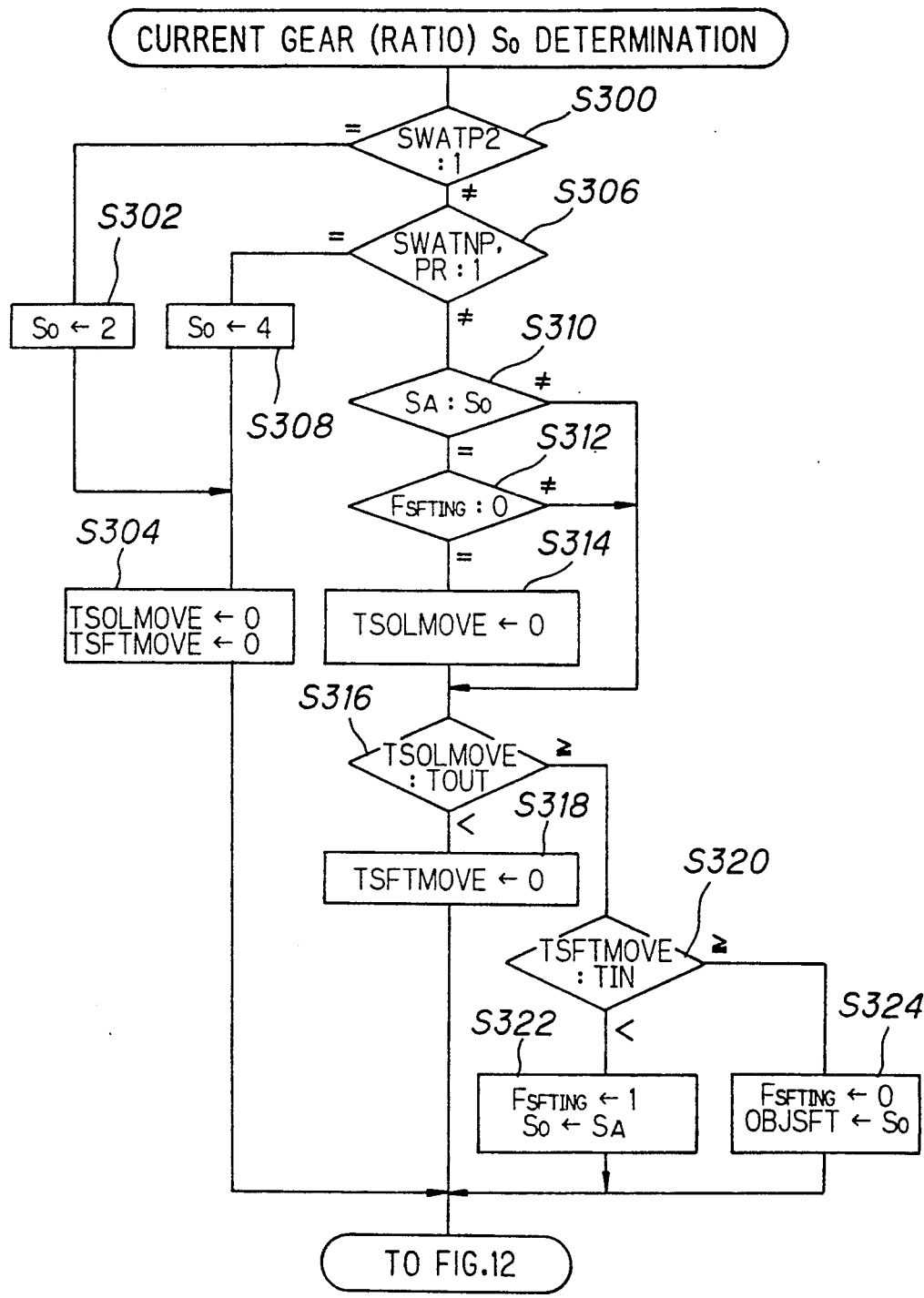
FIG. 13 is a flow chart showing current gear ratio determination referred to in FIG. 12 flow chart.

The flow chart of a subroutine for this determination is shown in FIG. 13. The subroutine starts with step S300 in which it is determined whether or not SWATP2, which indicates the second speed position of the range selector, is 1 (on), and if it is, control passes to step S302 in which the current gear position is determined to be second gear, and then to step S304 in which timers TSOLMOVE and TSFTMOVE (to be explained later) are reset, whereafter the subroutine is terminated. If SWATP2 is not 1 (on), control passes to step S306 in which it is determined whether either of SWATNP and PR is 1 (on), i.e. whether the range switch is in the N, P or R range, and if the result is affirmative, control passes to step S308 in which the current gear position is determined to be fourth gear. The subroutine is then terminated after execution of step S304.

If the result is negative and it is determined that the D range is selected, control passes to step S310 in which it is discriminated whether or not the gear position SA indicated by the ON/OFF pattern of the solenoids 36, 38 coincides with the current gear position $S_O$. Normally, they are found to coincide, so that control passes to step S312 in which it is found that the bit of a shifting-in-progress flag FSFTING is 0 (off) (shifting not in progress), to step S314 in which the timer TSOLMOVE is reset to 0, to step S316 in which it is found that TSOLMOVE<TOUT (TOUT will be explained later), and to step S318 in which the timer TSFTMOVE is reset to 0, whereafter the subroutine is terminated. In this case, the gear position indicated by the solenoid ON/OFF pattern is determined to be the current gear position.

When the solenoid pattern has changed because of the issuance of a gearshift command, the result in step S310 becomes negative and control passes to step S316 in which the timer value TSOLMOVE is compared with a prescribed value TOUT. The timer value TSOLMOVE here indicates the amount of time that has lapsed since the last change in the solenoid ON/OFF pattern and TOUT is the time required to pass before a new gearshift command can be accepted When it is found in step S316 that TSOLMOVE≧TOUT, meaning that the release of hydraulic pressure is nearing completion, control passes to step S320 in which the timer value TSFTMOVE is compared with a prescribed value TIN. The timer value TSFTMOVE indicates the amount of time that has lapsed since the start of gear shifting and TIN is the period of time between the setting of the bit of the shifting-in progress flag to 1 and the resetting of this flag. More specifically, it is the period of time up to the point where hydraulic engagement of the next gear is completed. In the first cycle it is found that TSFTMOVE<TIN and control passes to step S322 in which the shifting-in-progress flag FSFTING is set to 1. Since engagement of the next gear stage is in progress during this time, there would be no meaning in determining a shift command value, the determination of a gearshift command is not conducted. The gear position is defined as the next gear indicated by the ON/OFF pattern of the solenoids. When it is found in step S320 that TSFTMOVE≧TIN, control passes to step S324 in which the shifting-in-progress flag is reset and the current gear position $S_O$ is defined as the target gear position OBJSFT. The target gear position OBJSFT will be explained later.

Figure 14:
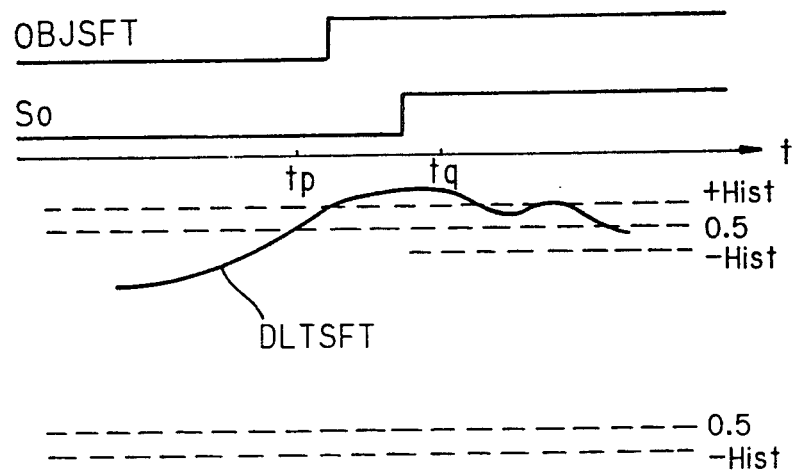
FIG. 14 is a graph showing threshold values used in FIG. 12 flow chart.
Figure 15:
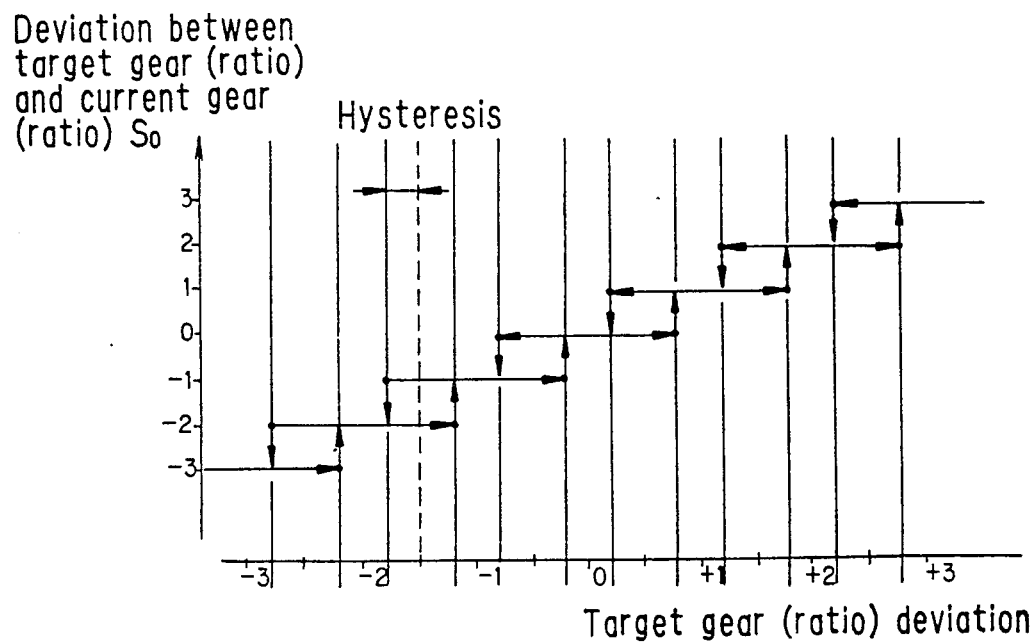
FIG. 15 is a graph showing the characteristics of the hysteresis referred to in FIG. 12.

Returning to FIG. 12, control passes to step S202 in which a discrimination is made to determine whether the shift command value DLTSFT is positive or negative. If it is zero or positive, either the current gear is maintained or a shift-up operation is conducted. Control thus passes downward in the flow chart to step S204 in which OBJSFT−$S_O$ and ISFT are compared and if ISFT is equal to or larger than this difference, control passes to step S206 in which the value obtained by adding 0.5 to the hysteresis HIST is determined as the threshold value TH. OBJSFT here is the target gear position after calculation of the hysteresis (explained later), $S_O$ is, as defined earlier, the current gear position, and the value ISFT is the integer part of the shift command value DLTSFT. This will be explained with reference to FIGS. 14 and 15. Referring first to FIG. 14 in which the current time is indicated as tp, since as determined in step S324 of FIG. 13, OBJSFT and $S_O$ are equal at the current time tp, the difference between them is zero. If the shift command value DLTSFT should be 0.8, then since the integer part ISFT of this value is 0, we get 0=0 and control passes to step S206. In order to prevent hunting during gearshift operations, hysteresis is ordinarily established on both the shift-up and shift-down sides. In the present embodiment, hysteresis is established as indicated in FIG. 15. In FIG. 15 this hysteresis is defined for the case of shifting up 1 gear position as 0.5+a prescribed value HIST. For example, for 0.2 it becomes 0.5+0.2=0.7 and the result is used in step S206 as the threshold value TH required for shift-up.

In the next step S210, therefore, this threshold value TH is compared with RSFT (the absolute value of the fractional part of DLTSFT). In this example, we get 0.8>0.7 and control passes to step S212 where 1 is added to the integer portion ISFT of DLTSFT, to obtain 0+1=1. Thus in step S214 the target gear position OBJSFT (after hysteresis calculation) is changed to the current gear position $S_O$+1.

Control then passes to step S216 in which it is discriminated whether or not the target gear position OBJSFT (after hysteresis calculation) is higher than fourth gear, and if it is, control passes to step S218 in which the final command value SFTCOM (the target gear after hysteresis calculation and having been subjected to the limitation check) is limited to fourth gear. When the result in step S216 is that the target gear position OBJSFT is not higher than the fourth gear, control passes to step S220 in which it is judged whether the target gear position OBJSFT is lower than the first gear, and if it is, the final command valued SFTCOM is defined as first gear in step S222. If it is not, control passes to step S224 in which the target gear position OBJSFT is replaced with the final command value SFTCOM and the subroutine is terminated.

In subsequent activations of the subroutine, if activation should occur at time tq in FIG. 14, for example, and the shift command value at that time should be on the decrease and have reached 0.3, for instance, the judgment in step S202 will remain 0.3>0 and control will pass to step S204 in which the right side will be 0 and the left side 1 so that control will pass to step S208 in which the threshold value will be changed to TH=0.5−0.2=0.3. As a result, the situation is step S210 becomes 0.3=0.3 and control will pass through steps S214–224 and out of this subroutine. The significance of this lies in the fact that, as shown in FIG. 14, the shift command value DLTSFT is apt to change frequently in response to the driving conditions so that it is possible that after issuance of a command value of 0.8 for a shift-up by one gear position, the value may thereafter decrease to 0.3, for example. In such as case, if the threshold value should be maintained constant, a decision that was in the process of being made for a shift-up operation might be changed to a decision for holding the current gear (or to one for a shift-down operation). Thus, undesirable hunting would occur. In this embodiment, therefore, the threshold value is set at 0.5+HIST and is then changed to 0.5−HIST, whereby no change is made in the command for shift-up insofar as the shift command value DLTSFT in FIG. 14 does not fall below 0.5−HIST.

The same principle applies when the shift command value DLTSFT in the subroutine of FIG. 12 is in the downward direction (is negative). Specifically, change of the threshold value is conducted in step S230 during the time that the steps S226–S234 are being executed, the target gear position OBJSFT is changed in step S214, the limitation check is completed and the final command value SFTCOM is determined. In this case, once a shift operation to a lower gear is decided, the threshold value is increased.

Next, a limitation check is conducted for preventing overrevving. As this check has been explained in detail in the applicant's earlier publication, it will be explained only briefly here. The once-determined shift position is rechecked and, if necessary, modified in according with the following:

1. If the vehicle speed is so high that the engine will obviously overrev when shifting down to the target gear position, then raise the target gear by one gear position.
2. If the target gear and the current gear are the same and the engine will overrev owing to increase in the engine speed if shift-up is carried out at a later time, then raise the target gear up by one gear position at the current time.

Returning to FIG. 3, control passes to the final step S22 in which in response to the final command value SFTCOM thus determined, a control value is output to the solenoids 36,38 such that the finally determined gear position is realized, and the program is terminated.

Owing to its aforesaid constitution, this embodiment of the invention is able to modify the shift scheduling steplessly in response to specific driving conditions, such as hill-climbing, hill-descent and the like, while at the same time taking full advantage of the well established shift diagram map retrieval technology, and, as such, is able to optimize the gear position at all times. For example, when the fuzzy correction amount becomes negative during hill-climbing, the map-retrieved value is adjusted in the downward direction so that the driver will not be annoyed by frequent shift operations. The system moreover provides a greater degree of freedom in determining the map characteristics. Among various other possibilities, for example, the characteristics of the shift diagram map can be determined for optimizing fuel economy and the fuzzy control can be used for correcting the retrieved values for enhancing the fuel-saving effect. In addition, the fact that the shift diagram map reliably covers the full range of driving conditions makes it possible to achieve reliable control.

Fuzzy reasoning falls into two categories: that based on fuzzy production rules and that based on fuzzy relationships. The fuzzy reasoning based on fuzzy production rules used in the present embodiment is the more appropriate for forward reasoning which, as in the case of determining gear ratios (gear positions), requires control values to be determined through the analysis of various current phenomena. It also facilitates the creation of a knowledge base and enables the control rules to be formulated in the manner of a dialogue, making it easier to incorporate the control know-how acquired by an experienced driver in operating a vehicle with a manual transmission. Another advantage is the ease with which the control rules can be modified for control improvement. Where considered appropriate, however, the invention can also be realized through the use of fuzzy reasoning based on fuzzy relationships. In the embodiment just described, since fuzzy reasoning is used only for adjusting map-retrieved values, the volume of fuzzy operations required is considerably less than would be necessary if the control should be conducted solely by means of fuzzy reasoning. It is therefore possible to realize the system with only a small memory capacity.

The combined use of map-retrieval and fuzzy reasoning also facilitates installation of the system in the vehicle. What is more, the system's use of logical operations for determining the driving resistance reduces the cost of the sensor system required.

A second embodiment of the invention will now be explained with reference to FIGS. 16–19, focusing primarily on the points of difference relative to the first embodiment.

As shown in FIG. 17, the second embodiment is provided with a fuzzy reasoning unit and the result of the fuzzy reasoning by this unit is used for correcting either the vehicle speed V or the throttle opening $\theta$TH (the vehicle speed V in the illustrated example) prior to the use of these values as address data for retrieving the gear position (gear ratio) from the shift diagram map. As in the first embodiment, the fuzzy reasoning unit consists of two sections. The first stage fuzzy reasoning section conducts reasoning for inferring the intention to decelerate of the driver and the second stage section conducts fuzzy reasoning on the basis of the value inferred in the first stage section and other operating parameters for determining a vehicle speed correction amount (delta V). The adjusted vehicle speed (pseudo vehicle speed V (expressed as V with a hat) and the unadjusted throttle opening $\theta$TH are used as address data for retrieving a gear position (gear ratio). FIG. 18 shows a set of fuzzy production rules used by the second stage fuzzy reasoning section for vehicle speed correction. Aside from the fact that the rule conclusions relate to the vehicle speed instead of the gear position, the rules of FIG. 18 are the same as those of the first embodiment shown in FIG. 5. FIG. 19 shows a set of fuzzy production rules for inferring intention to decelerate in the first stage fuzzy reasoning section. These rules are the same as those of the first embodiment shown in FIG. 6.

Figure 16:
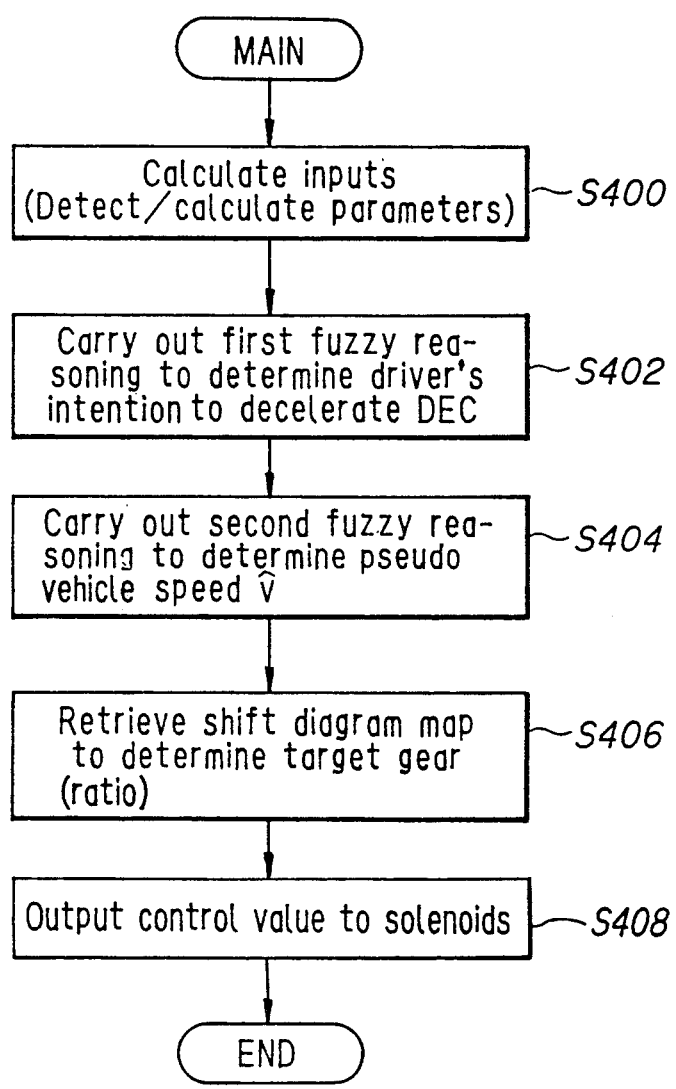
FIG. 16 is a flow chart, similar to FIG. 3, but showing a main routine flow chart according to a second embodiment of the present invention.

The program according to the flow chart of FIG. 16 starts with step S400 in which, as in the case of the first embodiment, input calculation is conducted. Namely, the parameters used for the fuzzy reasoning and the map retrieval are detected and calculated. While the types of parameters and the methods for obtaining them are the same as in the first embodiment, it should be noted that the actual gear position can be obtained either by logical operations as in the first embodiment or by detection of the ON/OFF pattern of the solenoids or from the output of a separately provided shift position switch.

Control then passes to step S402 in which a first fuzzy reasoning is conducted for inferring the driver's intention to decelerate and then to step S404 in which a second fuzzy reasoning is conducted on the basis of the aforesaid operating parameters, including the intention to decelerate, for deciding the vehicle speed correction amount delta V. As a result, in the case of hill-climbing, for example, the vehicle speed is adjusted to a value lower than that actually detected, typically in the manner of 40 km/h (detected speed)−18 km/h (speed correction amount)=22 km/h (pseudo vehicle speed), so that retrieval from the map will result in the use of a lower gear position (gear ratio). Control then passes to step S406 in which the pseudo vehicle speed V obtained by the adjustment and the unadjusted throttle opening θTH are used as address data for retrieving a gear position from the shift diagram map. Control then passes to the final step S408 in which in response to the retrieved value, a control value is output to the solenoids 36,38, and the program is terminated.

Owing to its aforesaid constitution, the second embodiment is, like the first embodiment, able to ensure use of the optimum gear position at all times. For example, when the fuzzy correction amount becomes negative during hill-climbing, the detected vehicle speed is adjusted downward so that the map-retrieved value is also adjusted downward, thus ensuring that the driver will not be annoyed by frequent shift operations.

While the second embodiment was explained with respect to the case where fuzzy reasoning is used for adjusting the vehicle speed, this is not limitative and, as shown in FIG. 17, it is alternatively possible to adjust the throttle opening or to adjust both the vehicle speed and the throttle opening.

Moreover, while the first and second embodiments were explained with respect to cases in which either the map-retrieved value or a sensor detection value is adjusted, this is not limitative and it is possible use an arrangement in which both a sensor value and the map-retrieved value are adjusted.

In addition, although the embodiments described in the foregoing relate to examples employing a multi-step transmission, this is not limitative and the invention can also be applied to a vehicle with a continuously variable transmission. Moreover, instead of ascertaining engine load from the throttle opening, it is possible to ascertain it from the amount of depression of the accelerator pedal.

It should be noted that, while the above description discloses preferred embodiments of the invention, numerous modifications or alterations may be made without departing from the scope of the invention as set forth in the following claims.

What is claimed is:

1. A system for controlling a multi-step geared or continuously variable automatic transmission of a vehicle, comprising:
    first means for determining parameters at least indicative of an engine load and a vehicle speed;
    second means for carrying out a fuzzy reasoning using parameters at least including the engine load and the vehicle speed to correct at least one of the determined engine load and the vehicle speed;
    third means for retrieving a preestablished shift diagram by the parameters at least including the one corrected through said fuzzy reasoning to determine a gear ratio to be shifted to;
    fourth means for carrying out a second fuzzy reasoning to infer a driver's intention and wherein said second means carries out the first fuzzy at least using the inferred driver's intention to correct at least one of the determined engine load and the vehicle speed parameters; and
    actuator means for driving a gear ratio shaft mechanism in response to the determined gear ratio.

2. A system according to claim 1, wherein said second means carriers out the fuzzy reasoning at least using a driving resistance to correct at least one of the determined engine load and the vehicle speed.

3. A system according to claim 1, further including fourth means for carrying out a second fuzzy reasoning at least using an engine load to infer the driver's intention to decelerate and said second means carries out the first fuzzy reasoning at least using the inferred driver's intention to decelerate to correct at least one of the determined engine load and the vehicle speed.

4. A system according to claim 1, wherein said second means carries out said fuzzy reasoning using one among a driving resistance, a current gear ratio, a vehicle speed and an engine load.

5. A system according to claim 1, wherein said fourth means carries out said second fuzzy reasoning using one among an engine load, a vehicle acceleration and a vehicle speed at braking.

6. In a system for controlling a multi-step geared or continuously variable automatic transmission of a vehicle including the steps of determining parameters at least indicative of an engine load and vehicle speed and determining a gear ratio to be shifted to using a preestablished shift diagram retrieved by using said determined parameters, an improved system of fuzzy logic control wherein said improvement comprises means for carrying out a first fuzzy reasoning to correct at least one of the determined parameters such that said preestablished shift diagram is retrieved by said determined paramters including the corrected one and further comprising means for carrying out a second fuzzy reasoning to infer the driver's intention to decelerate in order to facilitate the carrying out of said first fuzzy reasoning.

7. An improved system of fuzzy logic control as set forth in claim 6 further comprising means for correcting said gear ratio to be shifted to.

8. An improved system of fuzzy logic control as set forth in claim 6 wherein said fuzzy reasoning is carried out at least using a driving resistance to correct at least one of said determined parameters.

9. An improved system of fuzzy logic control as set forth in claim 6 wherein said fuzzy reasoning is carried out using at least one among a driving resistance, a current gear ratio, a vehicle speed and an engine load.

10. An improved system of fuzzy logic control as set forth in claim 6 wherein said second fuzzy reasoning is carried out using at least one among an engine load, a vehicle acceleration and a vehicle speed at braking.

11. An improved system of fuzzy logic control as set fourth in claim 6 further comprising means for driving a gear ratio shift mechanism with actuator means responsive to said determined gear ratio.

* * * * *

UNITED STATES PATENT AND TRADEMARK OFFICE
CERTIFICATE OF CORRECTION

PATENT NO. : 5,323,318
DATED : June 21, 1994
INVENTOR(S) : Hasegawa et al.

It is certified that error appears in the above-indentified patent and that said Letters Patent is hereby corrected as shown below:

Column 14, line 3, after "fuzzy" insert -- reasoning --.
Column 14, line 7, delete "shaft" and insert -- shift --.

Signed and Sealed this

Twentieth Day of December, 1994

Attest:

BRUCE LEHMAN

*Attesting Officer*  *Commissioner of Patents and Trademarks*